United States Patent
Nathan

(10) Patent No.: US 6,172,491 B1
(45) Date of Patent: *Jan. 9, 2001

(54) REMOTE FEEDING DEVICE

(75) Inventor: Adolf Nathan, Backnang (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/640,754

(22) PCT Filed: Sep. 29, 1994

(86) PCT No.: PCT/DE94/01128

§ 371 Date: Jul. 8, 1996

§ 102(e) Date: Jul. 8, 1996

(87) PCT Pub. No.: WO95/12916

PCT Pub. Date: May 11, 1995

(30) Foreign Application Priority Data

Oct. 30, 1993 (DE) .................................. 43 37 229

(51) Int. Cl.$^7$ ................................................ G05F 1/445
(52) U.S. Cl. ........................................ 323/282; 323/285
(58) Field of Search .................................. 323/273–277, 323/268, 271, 282, 283, 284, 285

(56) References Cited

U.S. PATENT DOCUMENTS

| | | | |
|---|---|---|---|
| 3,558,892 | * | 1/1971 | Seeley .................................. 323/273 |
| 4,176,309 | * | 11/1979 | Schulz et al. ........................ 323/273 |
| 4,321,525 | * | 3/1982 | Imazeki et al. ...................... 323/281 |
| 4,731,574 | * | 3/1988 | Melbert ............................... 323/275 |
| 4,757,251 | * | 7/1988 | Fuchs .................................. 323/271 |
| 4,929,882 | | 5/1990 | Szepesi . |
| 5,041,777 | * | 8/1991 | Reidger ............................... 323/277 |
| 5,192,906 | * | 3/1993 | Nathan ................................ 323/284 |
| 5,357,415 | * | 10/1994 | Kramer ............................... 323/282 |
| 5,408,173 | * | 4/1995 | Knapp ................................. 323/282 |
| 5,578,916 | * | 11/1996 | Muterspaugh ...................... 323/282 |
| 5,642,034 | * | 6/1997 | Amano ............................... 323/277 |
| 5,652,825 | * | 7/1997 | Schmider et al. .................. 323/282 |

FOREIGN PATENT DOCUMENTS

| | | |
|---|---|---|
| 3109087C2 | 8/1984 | (DE) . |
| 3604716 | 8/1987 | (DE) . |
| 4210785C1 | 9/1993 | (DE) . |
| 0421516 | 4/1991 | (EP) . |
| 0497106 | 8/1992 | (EP) . |
| 0559928 | 9/1993 | (EP) . |
| 2105122 | 3/1983 | (GB) . |
| 63-178764 | 7/1988 | (JP) . |

* cited by examiner

*Primary Examiner*—Peter S. Wong
*Assistant Examiner*—Derek J. Jardieu
(74) *Attorney, Agent, or Firm*—Michael J. Striker

(57) ABSTRACT

In connection with remote feeder devices it is often necessary to take steps not to exceed limit values, for example the maximally permissible contact voltage.

Customary voltage limiters evaluate the voltage at the output terminals of the remote feeder device. The remote feeder current can be distorted by the evaluation.

With the invention, a dynamic resistor (V1, V2) is provided at the base point of the voltage limiter (BU), which can be set in such a way that the voltage drop at the remote feeder current regulator (RI) can be compensated.

The range of the remote feeding or the distance between the intermediate current regenerators can be increased by means of the steps of the invention.

9 Claims, 1 Drawing Sheet

REMOTE FEEDING DEVICE

BACKGROUND OF THE INVENTION

The invention relates to a remote feeder device. Such a remote feeder device is known from DE 31 09 087 C2.

The remote feeder device in accordance with DE 31 09 087 C2 has a current regulator and a voltage limiter, connected on the output side with the current regulator. The voltage limiter is used for limiting or reducing the d.c. voltage resulting at the start of the section, in particular in case of a section disruption. A comparator is provided, which measures the section resistance via a measuring resistor. The output voltage is limited to a reduced value in case of an increase of the section resistance past a preset maximum value. The nominal output current is only delivered at a load below a resistance of 1 Kiloohm. Above this resistance a reduction of the voltage to, for example 60 V, takes place for the protection of personnel.

An installation for regulating the constant current of the remote feeder current in a d.c. remote feeder system is known from DE 42 10 785 C1. The remote feeder current is detected by means of a current sensor in the form of a current measuring resistor, is evaluated in a control device and is processed into a control signal for a pulse width modulator of a switching regulator. The feeder energy for the regulating device is taken directly from the remote feeder loop. So that this current evaluation is not distorted, feeding of the control device is performed via a constant current source.

It is known from JP 63-178 764 (A) in "Patent Abstracts of Japan", Sect. E, 1988, Vol. 12, No. 452, E-687, to detect the output voltage as well as the output current in an output circuit of a switching regulator for supplying a consumer, and to process a control signal for the switching regulator as a function of this.

SUMMARY OF THE INVENTION

It is the object of the instant invention to design a remote feeder device in such a way that it becomes possible to deliver as high as possible a remote feeder output, wherein protective rules in respect to permissible limit values, for example the maximally permissible contact voltage, are to be particularly observed.

The invention is based on the following realizations:

If the voltage of the feeder device is measured at its output terminals—as in the realization in accordance with JP 63-178 764—the remote feeder current is affected by the voltage evaluation circuit, i.e. a portion of the current flows through this evaluation circuit and is not available for remote feeding. Furthermore, the voltage evaluation at the output terminals is not usable for a high accuracy current evaluation. With the invention, the base point of the voltage limiter is adjusted, free of distortions in respect to the remote feeder current, in such a way that the voltage drop at the current sensor of the remote feeder current regulator is compensated for the voltage evaluation. Then the maximally possible contact voltage, in accordance with VDE 0800/DIN 57800 a remote feeder d.c. voltage of 120 V, is available at the output terminals of the remote feeder device. In contrast to the known solutions with a voltage limiter downstream of the current regulator, the maximally possible remote feeder output is therefore available, which increases the range of the remote feeding. The number of intermediate regenerators in message transmission systems, in particular glass fiber transmission systems, can be reduced because of the increased range.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
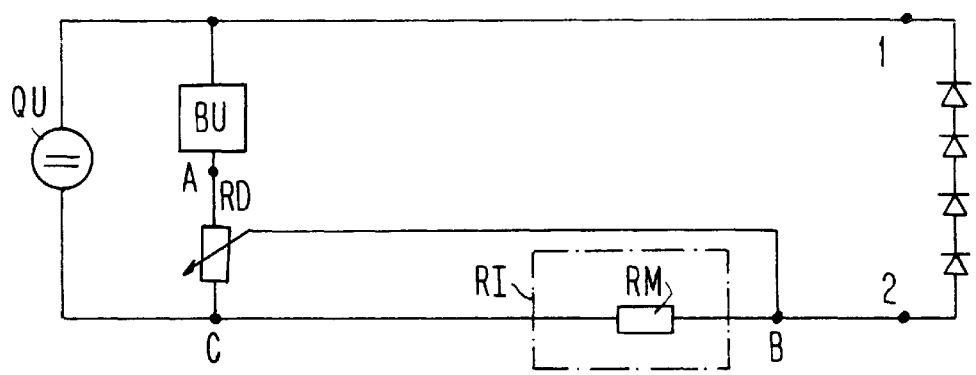
FIG. 1, a schematically represented remote feeder device.

The remote feeder device schematically represented in FIG. 1 has a supply voltage source QU. The series circuit of a voltage limiter BU and a dynamic resistor RD is located between the terminals of this supply voltage source. The output terminals of the remote feeder device are indicated by 1, 2. The remote feeder section with consumers connected thereto is schematically represented by a series circuit of Zener diodes. In place of Zener diodes, it is possible to represent the remote feeder section with consumers by complex resistors. A remote feeder current regulator RI is disposed in the return line of the remote feeder device, i.e. between the terminal 2 and the base point of the dynamic resistor connected with the supply voltage source QU. Its current sensor is characterized by the current measuring resistor RM. The voltage drop at the current measuring resistor RM of the remote feeder current regulator RI is measured and the dynamic resistor RD is adjusted as a function of this voltage drop. In this case the adjustment takes place in such a way that the voltage drop at the current measuring resistor RM is of the same size as the voltage drop at the dynamic resistor RD. Thus, in the ideal case the following applies:

$U_{AC}=U_{BC}.$

If a level conversion or an impedance transformation is performed, the following applies in general:

$U_{AC}=V \cdot U_{BC}+K_{const},$ where V represents an amplification factor.

The voltage limiter BU is of such a size that it only responds, i.e. reduces the voltage of the supply voltage source QU, when the remote feeder voltage has reached the maximum value of 120 V.

Figure 2:
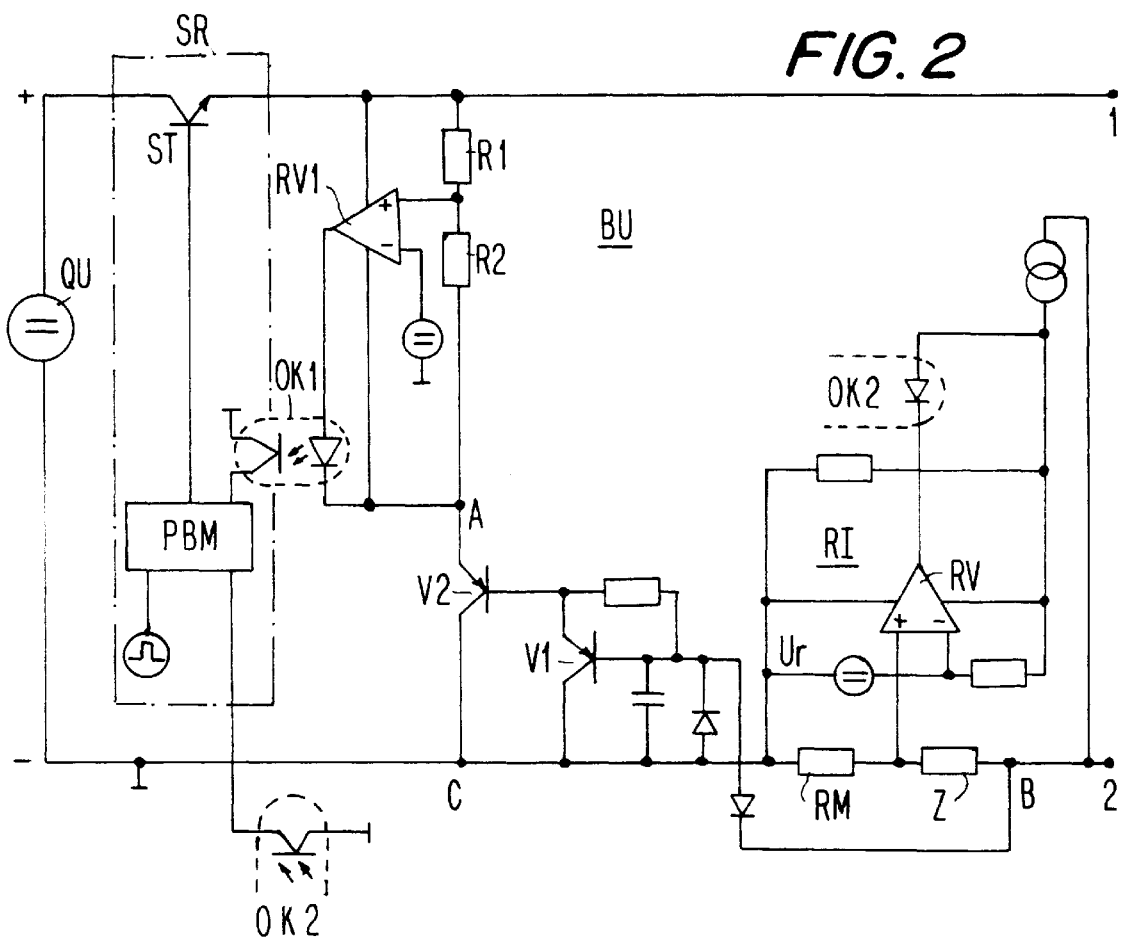
FIG. 2, a circuit diagram of an exemplary embodiment of the invention.

As the exemplary embodiment in accordance with FIG. 2 shows, the dynamic resistor can consist of a control transistor V2, which is controlled as a function of the voltage drop $U_{BC}$. So that the control current for the dynamic resistor RD can be kept negligibly small, it is preferably realized by means of two transistors V1 and V2, which are operated in a Darlington circuit.

The voltage limiter BU consists, for example, of a control amplifier RV1, controlled via the voltage divider R1, R2, which is connected between the terminal 1 and the point A.

If the output voltage US of the switching regulator SR increases because of a relief of the remote feeder device, the optical coupler OK1 is triggered and a pulse width modulator PBM acts to shorten the conducting time of the switching regulator servo component ST(transistor). The remote feeder current regulator RI can also be a component of the switching regulator SR in that a signal proportional to the remote feeder current also affects the servo component of the switching regulator SR. The remote feeder current regulator RI and the voltage limiter BU are of such a size that in the normal case the remote feeder current regulator RI is the control mode. Only in case of a relief in the remote feeder loop does the voltage limiter BU take over from the remote feeder current regulator RI.

It is possible to employ a transducer or corresponding element in place of a current measuring resistor for the current sensor RM of the remote feeder current regulator. The remote feeder current regulator RI can be designed in accordance with the current regulator of DE 42 10 785 C1, i.e. a control amplifier RV compares the voltage drop at the current measuring resistor RM with a reference voltage Ur. If this voltage drop exceeds the threshold value provided by the reference voltage Ur, a signal which is proportional to the current is transmitted via the optical coupler OK2 to the pulse width modulator PBM for the switching regulator servo component ST.

Additional voltage drops in series with the current measuring resistor (symbolized by Z), which are necessary, for example, for the current supply for the remote feeder current regulator RI, or are basically present (for example line sections, couplers), do not distort the voltage evaluation, since the evaluation takes place directly at the output connector (point B). The voltage drop at the current sensor RM, or at the complex resistor z, can also be utilized for current regulation and/or current monitoring.

What is claimed is:

1. A remote feeder device comprising:

a supply voltage source;

output terminals;

a remote feeder current regulator having a current sensor;

a voltage limiter connected with said supply voltage source for limiting a remote feeder voltage to a maximum value;

an adjustable dynamic resistor which is connected in series with said voltage limiter associated with said remote feeder current regulator, said dynamic resistor having a base point which is connected with said current regulator and being adjustable so that its voltage drop corresponds to a voltage drop at said current sensor, said current sensor of said remote feeder current regulator being located between one of said output terminals and said dynamic resistor, said dynamic resistor having a terminal which is connected to said supply voltage source, said dynamic resistor also having a control connector which is in operative connection with said current sensor leading to one of said output terminals; and evaluating means provided for said voltage limiter and located on an opposite side of said current sensor of said remote feeder current regulator from said output terminals.

2. A remote feeder device as defined in claim 1, wherein said dynamic resistor is adjustable so that its voltage drop corresponds to a voltage drop of said remote feeder current regulator.

3. A remote feeder device as defined in claim 1, wherein said dynamic resistor has at least one control transistor which is controllable as a function of the voltage drop at said current sensor of said remote feeder current regulator.

4. A remote feeder device as defined in claim 1, wherein said current sensor includes a current measuring resistor.

5. A remote feeder device as defined in claim 1, wherein said current sensor includes a transducer.

6. A remote feeder device as defined in claim 1, wherein the voltage drop at said current sensor is evaluatable for a current regulation of the remote feeder device.

7. A remote feeder device as defined in claim 1, and further comprising a switching regulator connected downstream of said supply voltage source and having a transistor with a conducting time which is adjustable as a function of an output signal of said remote feeder current regulator.

8. A remote feeder device as defined in claim 1; and further comprising a switching regulator connected downstream of said supply voltage source and having a transistor with a conducting time which is adjustable as a function of an output signal of said voltage limiter.

9. A remote feeder device as defined in claim 8, wherein the conducting time of said transistor of said switching regulator is also adjustable as a function of an output signal of said remote feeder current regulator.

* * * * *